United States Patent
Ozawa et al.

[11] Patent Number: 5,954,553
[45] Date of Patent: *Sep. 21, 1999

[54] WATERCRAFT WITH CATALYTIC EXHAUST SYSTEM

[75] Inventors: Shigeyuki Ozawa; Ryoichi Nakase; Hiroaki Fujimoto, all of Iwata, Japan

[73] Assignee: Yamaha Hatsudoki Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/698,043

[22] Filed: Aug. 15, 1996

[30] Foreign Application Priority Data

Aug. 15, 1995  [JP]  Japan ................................. 7-208033

[51] Int. Cl.⁶ .................................................. B63H 21/32
[52] U.S. Cl. ............................... 440/89; 60/320; 114/270
[58] Field of Search ..................... 440/88, 89; 114/270; 60/320–322

[56] References Cited

U.S. PATENT DOCUMENTS

| | | | |
|---|---|---|---|
| 4,664,054 | 5/1987 | Nishida | 114/270 |
| 4,773,883 | 9/1988 | Nakase et al. | 440/89 |
| 4,811,560 | 3/1989 | Nakase et al. | 440/89 |
| 4,982,682 | 1/1991 | Hattori | 440/89 |
| 4,989,409 | 2/1991 | Nakase et al. | 440/89 |
| 4,997,399 | 3/1991 | Nakayasu et al. | 440/88 |
| 5,067,448 | 11/1991 | Nakase et al. | 123/41.31 |
| 5,096,446 | 3/1992 | Tazaki et al. | 440/89 |
| 5,234,364 | 8/1993 | Ito | 440/89 |
| 5,251,439 | 10/1993 | Nakase et al. | 440/89 |
| 5,324,217 | 6/1994 | Mineo | 440/89 |
| 5,366,401 | 11/1994 | Nanami et al. | 440/89 |
| 5,408,827 | 4/1995 | Holtermann et al. | 60/298 |
| 5,511,505 | 4/1996 | Kobayashi et al. | 440/89 |
| 5,562,509 | 10/1996 | Nakase et al. | 440/89 |

*Primary Examiner*—Jesus D. Sotelo
*Attorney, Agent, or Firm*—Knobbe, Martens, Olson & Bear, LLP

[57] ABSTRACT

A personal watercraft includes a catalytic exhaust system in order to reduce discharge of pollutants. A catalyzer of the exhaust system is located within an expansion chamber. The expansion chamber, as well as the internal combustion engine of the personal watercraft, are enclosed within a hull. The watercraft hull desirably includes an access opening located near the catalyzer. The access opening is of a size sufficient to allow at least the catalyzer to be removed from the hull of the personal watercraft for servicing or cleaning.

15 Claims, 5 Drawing Sheets

5,954,553

WATERCRAFT WITH CATALYTIC EXHAUST SYSTEM

BACKGROUND OF THE INVENTION

1. Field of the Invention

This invention relates to an exhaust system for a personal watercraft and more particularly to a catalytic exhaust system for such watercraft.

2. Description of Related Art

Personal watercrafts have become very popular in recent years. This type of watercraft is quite sporting in nature and carries a rider and possibly one or two passengers. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull that forms a front gullet portion of the tunnel.

An exhaust system of the personal watercraft discharges engine exhaust to the atmosphere either through or close to the body of water in which the watercraft is operating. Although submerged discharge of engine exhaust silences exhaust noise, environmental concerns arise. These concerns are particularly acute in connection with two-cycle engines because engine exhaust from two-cycle engines often contains lubricants and other hydrocarbons.

Such environmental concerns have raised a desire to reduce exhaustion of hydrocarbons and other exhaust byproducts (e.g., carbon monoxide and oxides of nitrogen) and thus reduce pollution of the atmosphere and the body of water in which the watercraft is operated. In response to the increased concerns regarding exhaust emissions, some personal watercraft recently have become equipped with a catalyst to convert exhaust byproducts to harmless gases.

The sporting nature of a personal watercraft subjects the catalyst to damage, however. Catalysts must operate at a relatively high temperature in order to produce the necessary thermal reaction and burning of exhaust byproducts. The sporting nature of the personal watercraft makes it likely that water occasionally will enter the exhaust system watercraft, especially if the watercraft becomes inverted and is subsequently righted. If a significant amount of water comes in contact with the catalyst, the catalyst bed can become polluted, particularly when operating in marine environments, and can even shatter.

SUMMARY OF THE INVENTION

A need therefore exists for an exhaust system of a personal watercraft that includes a catalyst arranged within a hull of the watercraft in an easily accessible position. An easily accessible position facilitates servicing of the catalyst without substantial disassembly of the watercraft engine and exhaust system, as well as permits convenient removal of the catalyst for cleansing purposes.

Thus, an aspect of the present invention involves a personal watercraft comprising an internal combustion engine enclosed within a hull of the watercraft. The hull includes an access opening formed above the engine. The engine has at least one exhaust port and an output shaft which drives a propulsion device. An exhaust system extends between the engine exhaust port and a discharge port, and includes a catalyzer to treat exhaust gases from the engine before discharge through the discharge port. The catalyzer is located near the access opening in order to facilitate easy servicing of the catalyzer.

In accordance with another aspect of the present invention, a personal watercraft comprises an internal combustion engine housed within a compartment of a watercraft. The engine has at least one exhaust port which communicates with an exhaust system. The exhaust system discharges exhaust gases from the engine to a discharge port, and including a catalyzer to treat the exhaust gases. A cooling jacket is juxtaposed to at least a portion of the exhaust system and discharges at least a portion of coolant flowing through the cooling jacket into the exhaust system. The catalyzer is positioned upstream of a point at which the cooling jacket introduces coolant into the exhaust system. The hull includes an access opening located near the catalyzer.

An additional aspect of the present invention involves a personal watercraft comprising an internal combustion engine enclosed within a compartment of a hull of the watercraft. The engine has at least one exhaust port and an output shaft which drives a propulsion device. An exhaust system extends between the engine exhaust port, and a discharge port and includes a catalyzer positioned in an expansion chamber. The catalyzer is arranged to treats exhaust gases from the engine before discharge through the discharge port. The hull includes an opening into the compartment at a point near the location of the catalyzer.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
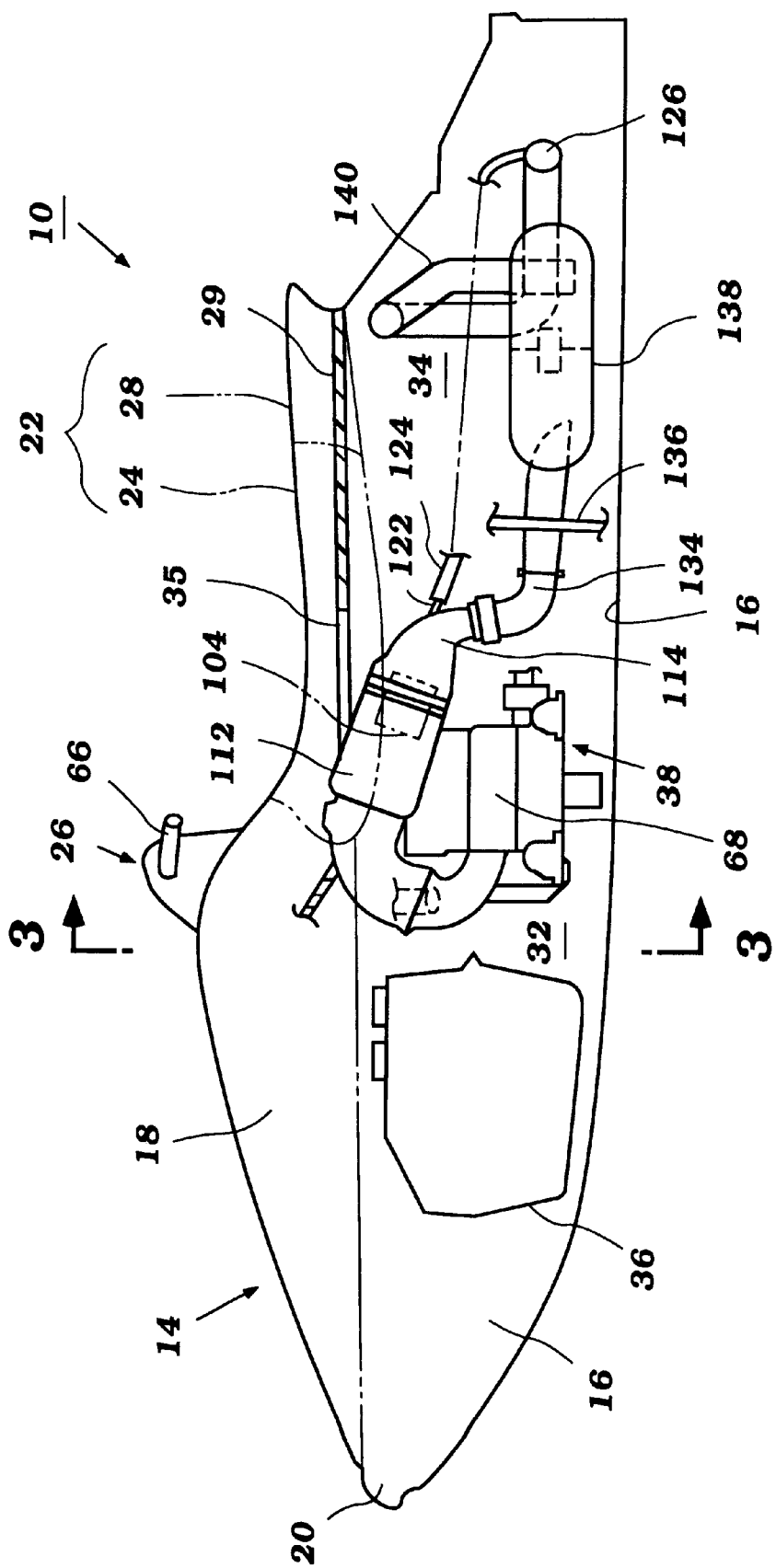
FIG. 1 is a side elevational view, with a portion broken away, of a personal watercraft with a catalytic exhaust system constructed in accordance with a preferred embodiment of the invention.
Figure 2:
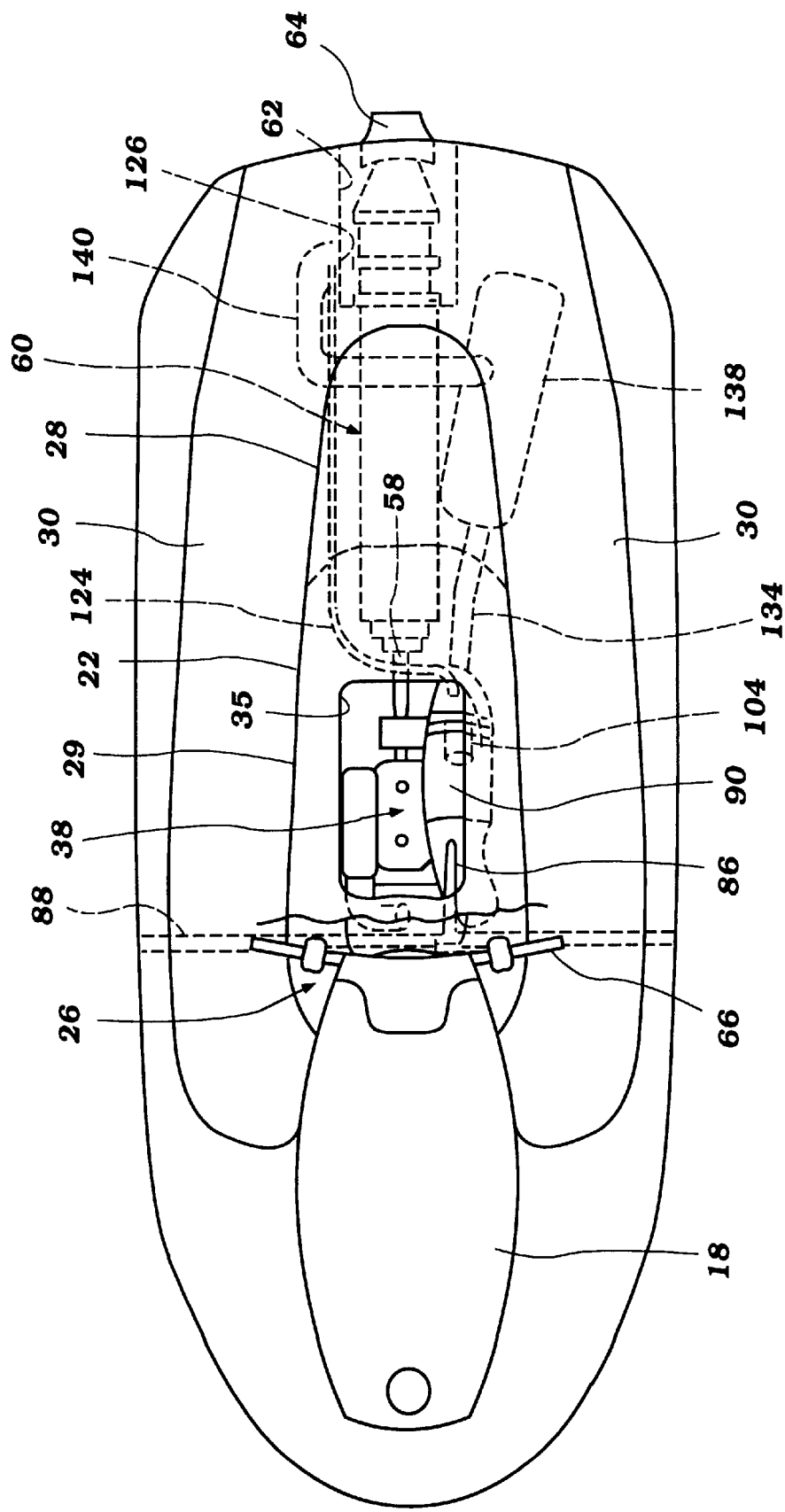
FIG. 2 is a top plan view of the watercraft of FIG. 1.

FIGS. 1 and 2 illustrate a personal watercraft 10 which includes a catalytic exhaust system 12 configured in accordance with a preferred embodiment of the present invention. Although the present exhaust system 12 is illustrated in connection with a personal watercraft 10, the exhaust system 12 can be used with other types of watercraft as well, such as, for example, but without limitation, small jet boats and the like.

The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

A passenger seat 22 is provided proximate to the stem of the hull 14. The passenger seat 22 is mounted longitudinally along the center of the watercraft 10. In the illustrated embodiment, the seat 22 has a longitudinally extended straddle-type shape which may be straddled by an operator and by at least one or two passengers. A forward end 24 of the seat 22 lies proximate to the controls 26 of the watercraft 10 which generally lie at about the longitudinal center of the watercraft 10. This position of the operator on the watercraft 10 gives the watercraft fore and aft balance when the operator rides alone. A rear portion 28 of the seat 22 is configured to allow one or two passengers to be comfortably seated behind the operator of the watercraft 10. The front and rear portions 24, 28 of the seat 22 desirably are padded to increase the comfort of the operator and the passengers.

A pedestal 29 supports the seat 22 at a desired height on the hull 14. The pedestal 29 is integrally formed into the upper deck section 18. At least the front section 24 of the seat 22 is removably secured to the pedestal 29. A latch or similar convenient coupling releasably secures at least the front section 24 of the seat 22 to the pedestal 29. As understood from FIG. 1, the sides of both the front and rear portions 24, 28 of the seat 22 wrap around the sides of the pedestal 29 to enhance the comfort of the seat 22, as known in the art.

Figure 3:
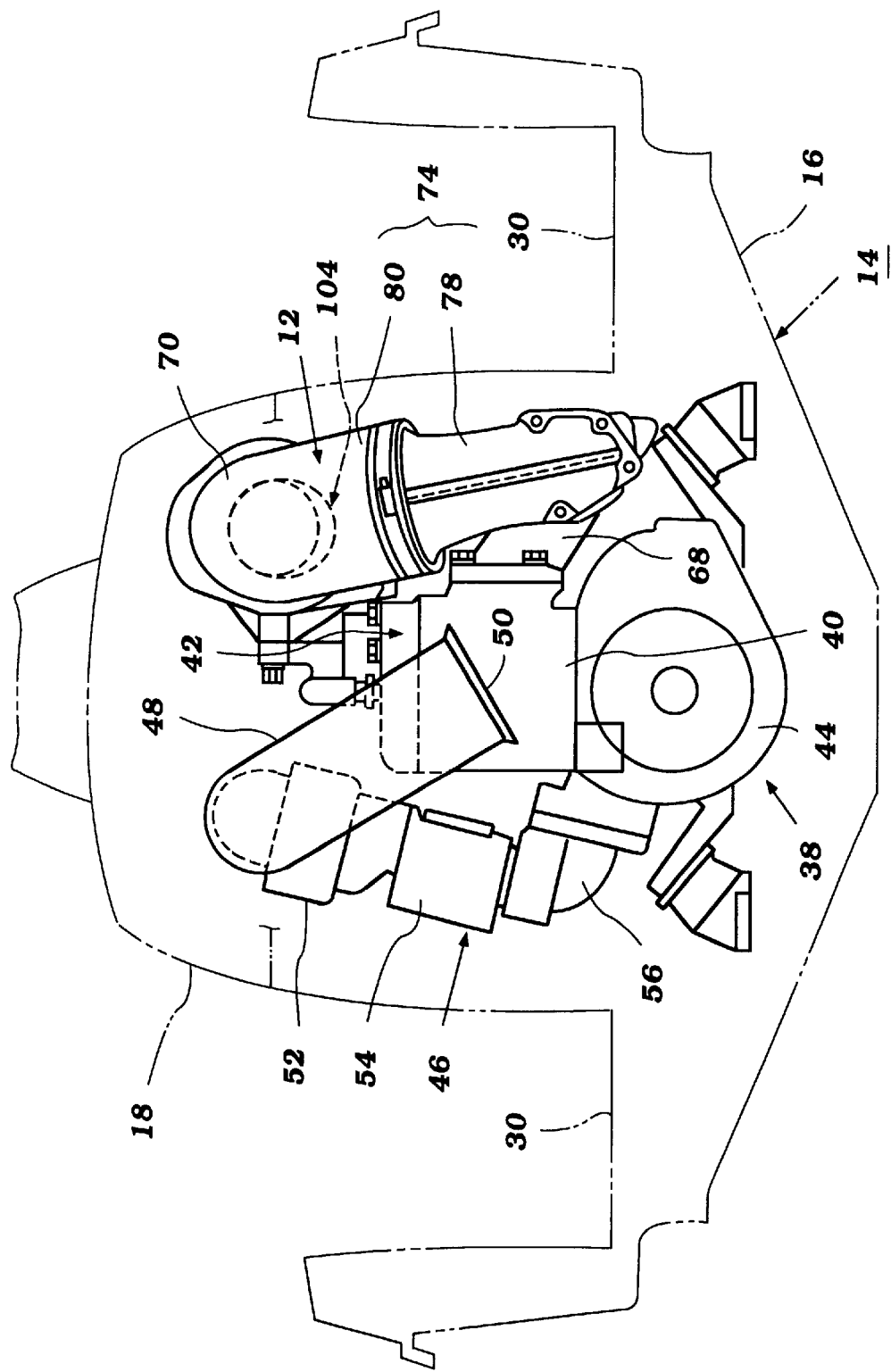
FIG. 3 is an enlarged cross-sectional view taken along the line 3—3 of FIG. 1, with the hull shown in phantom.

With reference to FIGS. 2 and 3, the upper deck section 18 of the hull 14 advantageously includes foot areas 30. The foot areas 30 extend generally longitudinally and parallel to the sides of the elongated seat 22 so that the operator and any passengers sitting on the seat 22 can place their feet in the foot areas 30. A non-slip surface (not shown) is located in the foot areas 30 to provide increased grip and traction for the operator and the passengers.

The lower hull section 16 of the personal watercraft 10 includes a forward compartment 32 and a rear compartment 34. The rear compartment 34 lies below the pedestal 29. An opening 35 is formed in the pedestal 29 to provided access into the pedestal 29. In the illustrated embodiment, the access opening 29 is located beneath the front portion 24 of the seat 22, near the watercraft controls 26.

In the exemplary watercraft depicted in FIG. 1, a fuel tank 36 and a buoyant block (not illustrated) are located in the forward compartment 32. The buoyant block affords additional buoyancy to the watercraft 10.

An internal combustion engine 38 powers the watercraft 10. The engine 38 is contained within the rear compartment 34 and is mounted primarily beneath the forward portion of the seat 22. Engine mounts secure the engine 38 to the hull lower portion 16 in a known manner.

In the illustrated embodiment, the engine 38 includes two in-line cylinders and operates on a two-stroke crankcase compression principle. This engine type, however, is merely exemplary. Those skilled in the art will readily appreciate that the present exhaust pipe cooling system can be used with any of a variety of engine types having other number of cylinders, having other cylinder arrangements and operating on other combustion principles (e.g., four-stroke principle).

As best seen in FIG. 3, a cylinder block 40 and a cylinder head assembly 42 desirably form the cylinders of the engine 38. Pistons reciprocate within the engine 38 and drive an output shaft, such as a crankshaft, in a known manner. The crankcase desirably is journaled with a crankcase 44, which in the illustrated embodiment is located beneath the cylinder block 40.

A conventional induction system 46 supplies a fuel/air charge to a plurality of crankcase chambers formed within the crankcase 40. The induction system 46 is disposed at one side of the engine 38 on one side of a longitudinally extending center plane.

As best seen in FIGS. 2 and 3, the induction system 46 includes an air inlet device 48 which has a downwardly facing opening 50. The air inlet device 48 supplies air to a plenum chamber 52 which extends along the inlet side of the engine 38. The plenum chamber 52 communicates with at least one charge former 54 that in turn delivers the fuel-air charge to an intake manifold 56. The charge former 54 receives fuel through a conventional fuel delivery system that draws fuel from the fuel tank 36.

The intake manifold 56 is mounted to a side of the crankcase member 44 and communicates with each crankcase chamber. The crankcase chambers of the engine 38 are sealed from one another with each crankcase chamber communicating with a dedicated combustion chamber. The combustion chamber is defined between the corresponding cylinder bore, piston and cylinder head. Because the internal details of the engine 38 desirably are conventional, a further description of the engine construction is not believed necessary to understand and practice the invention.

As seen in FIG. 2, a coupling interconnects the engine crankshaft to an impeller shaft 58. If the engine output shaft is vertically disposed, the impeller shaft 58 will be driven through a bevel gear transmission or a similar transmission. The propeller shaft 58 extends rearwardly to a jet propulsion unit 60 and drives an impeller of the unit 60.

The jet propulsion unit 60 is positioned in a tunnel 62 in the rear center of the lower hull section 16. The rotating impeller, which the impeller shaft 58 drives, pressurizes the water within the unit 60 and forces the pressurized water through the nozzle section of the propulsion unit 60. A steering nozzle 64 directs the exit direction of the water stream exiting the jet propulsion unit 60. The steering nozzle 64 is pivotally supported at the rear of the jet propulsion unit 60 to change the thrust angle on the watercraft 10 for steering purposes as is known in the art.

The steering nozzle 64 is connected to a steering handle 66. The steering handle 66 forms part of the operator controls 26 which are mounted in front of the operator seat 22 as noted above. The steering handle 66 also can include a throttle control for controlling the speed of the engine 38.

The propulsion unit 60 supplies cooling water through a conduit (not shown) to an engine cooling jacket. The engine cooling jacket extends through cylinder block 40, about the cylinders, and through the cylinder head assembly 42. The cylinder head 42 includes a coolant discharge port through which the cooling water exits the engine 38, as described below.

The engine 38 and propulsion device 60 so far described are conventional and represent only an exemplary propulsion mechanism for the watercraft 10. A further description of these components of the personal watercraft 10 therefore is not believed necessary for an understanding and an appreciation of the present exhaust system.

The exhaust system 12 of the illustrated embodiment is similar to the watercraft catalytic exhaust system disclosed in co-pending application Ser. No. 08/484,953, filed Jun. 7, 1995, in the names of Ryoichi Nakase, Shigewuki Ozawa, and Hiroaki Fujimoto, and assigned to the assignee hereof, which is hereby incorporated by reference. Those skilled in the art, however, can readily adapt other type of catalytic exhaust systems to obtain the advantages of the present invention.

The exhaust system 12 discharges exhaust byproducts from the engine 38 to the atmosphere and/or to the body of water in which the watercraft 10 is operated. As best seen in FIGS. 1 through 3, the exhaust system 12 includes an exhaust manifold 68 that is affixed to the side of the cylinder block 40 and which receives exhaust gases from the combustion chambers through exhaust ports in a well-known manner.

An outlet end of the exhaust manifold communicates with a C-shaped pipe section 70. This C-pipe 70 includes a C-shaped inner tube 72 that communicates directly with the discharge end of the exhaust manifold 68. An outer tube 74 surrounds the inner tube 72 to form a water jacket 76 between the inner and outer tubes 72, 74. The water jacket 76 communicates with the discharge port of engine water jacket.

The outer tube 74 is formed by upper and lower sections 78, 80. A flexible coupling 82 connects together the sections 78, 80 so as to permit expansion and contraction between the sections 78, 80 and accommodate thermal variations. The coupling 82 tightly holds together the upper and lower sections 78, 80 to prevent leakage from the water jacket 76.

The upper section 80 of the outer tube 74 includes a port 84 which communicates with a conduit 86. A portion of the coolant flow through the water jacket 76 is diverted into the conduit 86. The conduit 86 in turn communicates with a discharge line 88 in order to discharge the cooling water to the body of water in which the watercraft 10 is operated. In the illustrated embodiment, as seen in FIG. 2, the outlets to the discharge line 88 lie on either side of the watercraft hull 14 to act as a telltale indicator, exhibiting proper function of the engine cooling system.

The outlet end of the C-pipe 70 communicates with an expansion chamber 90. The expansion chamber 90 has a dual shell construction formed in part by an inner shell 92 which defines an expansion chamber volume. An outer shell 94 surrounds the inner shell 92 and defines a cooling jacket 96 about the inner shell 92 with a header 98 connecting together the inner and outer shells 92, 94.

An inner, dual band flexible coupling 100 connects together an inner portion of the header 98 with an outlet end of the C-pipe inner tube 72. A flow passage $P_1$ through the inner tube 72 communicates with an upper portion $P_2$ of the expansion chamber 90.

An outer flexible coupling 102 similarly connects together an outer portion of the header 98 with an outlet end of the C-pipe outer-upper section 80. In this manner, the water jacket 96 of the expansion chamber 90 communicates with the water jacket 76 of the C-pipe 70 to receive cooling water from the engine 38.

The expansion chamber 90 desirably houses a catalyzer 104. In the illustrated embodiment, the catalyzer 104 includes an annular shell 106 supporting a honeycomb-type catalyst bed 108. The catalyst bed 108 is formed of a suitable catalytic material such as that designed to treat and render harmless hydrocarbons, carbon monoxide, and oxides of nitrogen.

An annular flange 110 supports the annular shell 104 generally at the center of the flow path L through the expansion chamber volumes. In this manner, all exhaust gas flow through the expansion chamber 90 passes through the catalyst bed 108.

In the illustrated embodiment, the annular flange 110 is held between upper and lower sections 112, 114 of the expansion chamber 90. Each section 112, 114 of the expansion chamber 90 includes the dual shell construction described above. A header 116 interconnect the inner and outer shells 92, 94 of the expansion chamber lower section 114.

Fasteners 118 releasably join together the upper and lower sections 112, 114, with the flange 110 interposed therebetween. The fasteners 118 desirably can be removed in order to separate the sections 112, 114 of the expansion chamber 90 in order to service or clean the catalyst bed 108. In the illustrated embodiment, the fasteners 118 are bolts that pass through aligned through holes in the lower expansion chamber section 114 and the flange 110, and thread into corresponding threaded holes in upper expansion chamber section 112; however, other types of releasable couplings also can be used as well to connect the upper and lower expansion chamber sections 112, 114.

Figure 4:
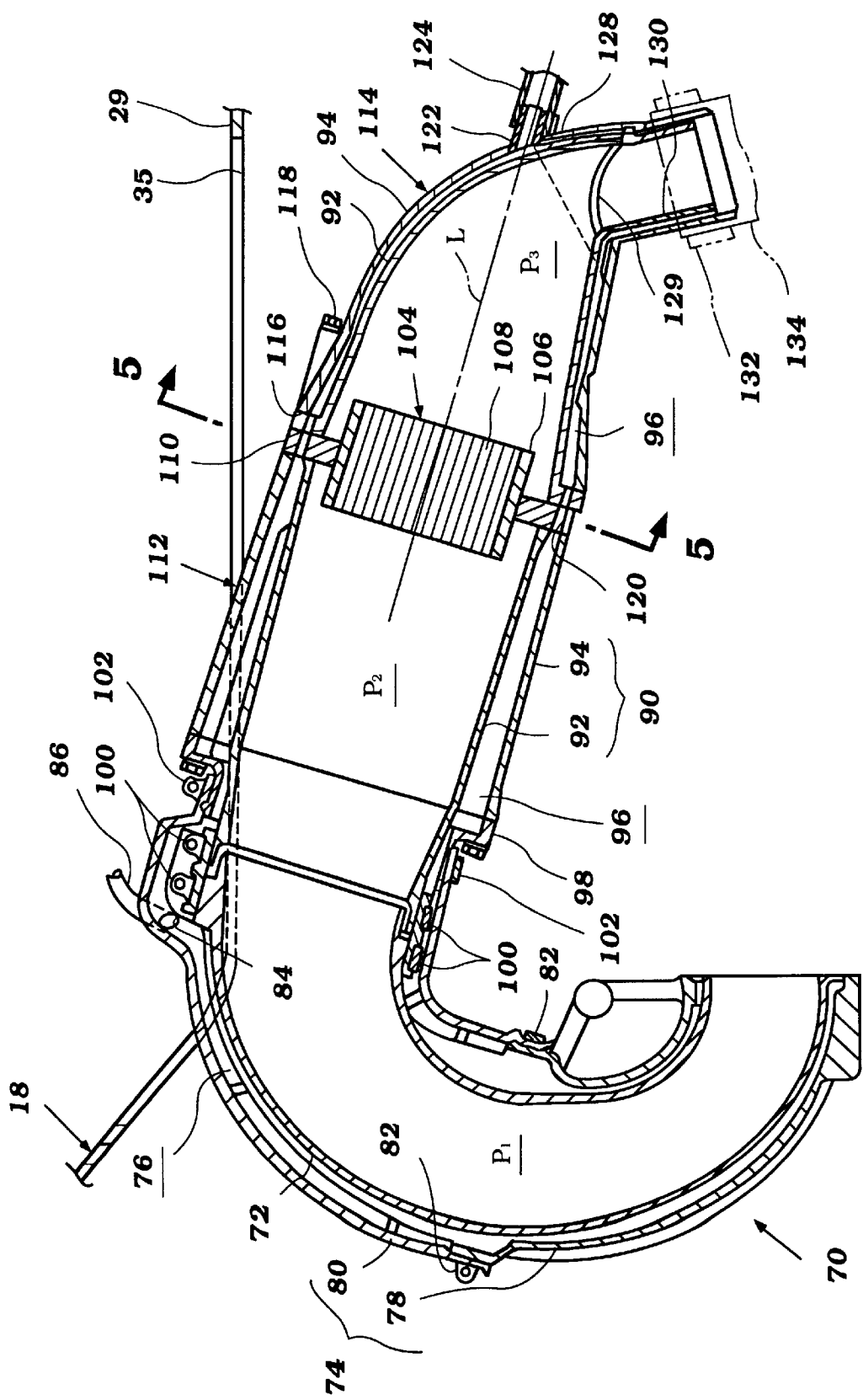
FIG. 4 is an enlarged cross-sectional view taken through the exhaust expansion chamber device of the exhaust system of FIG. 1.
Figure 5:
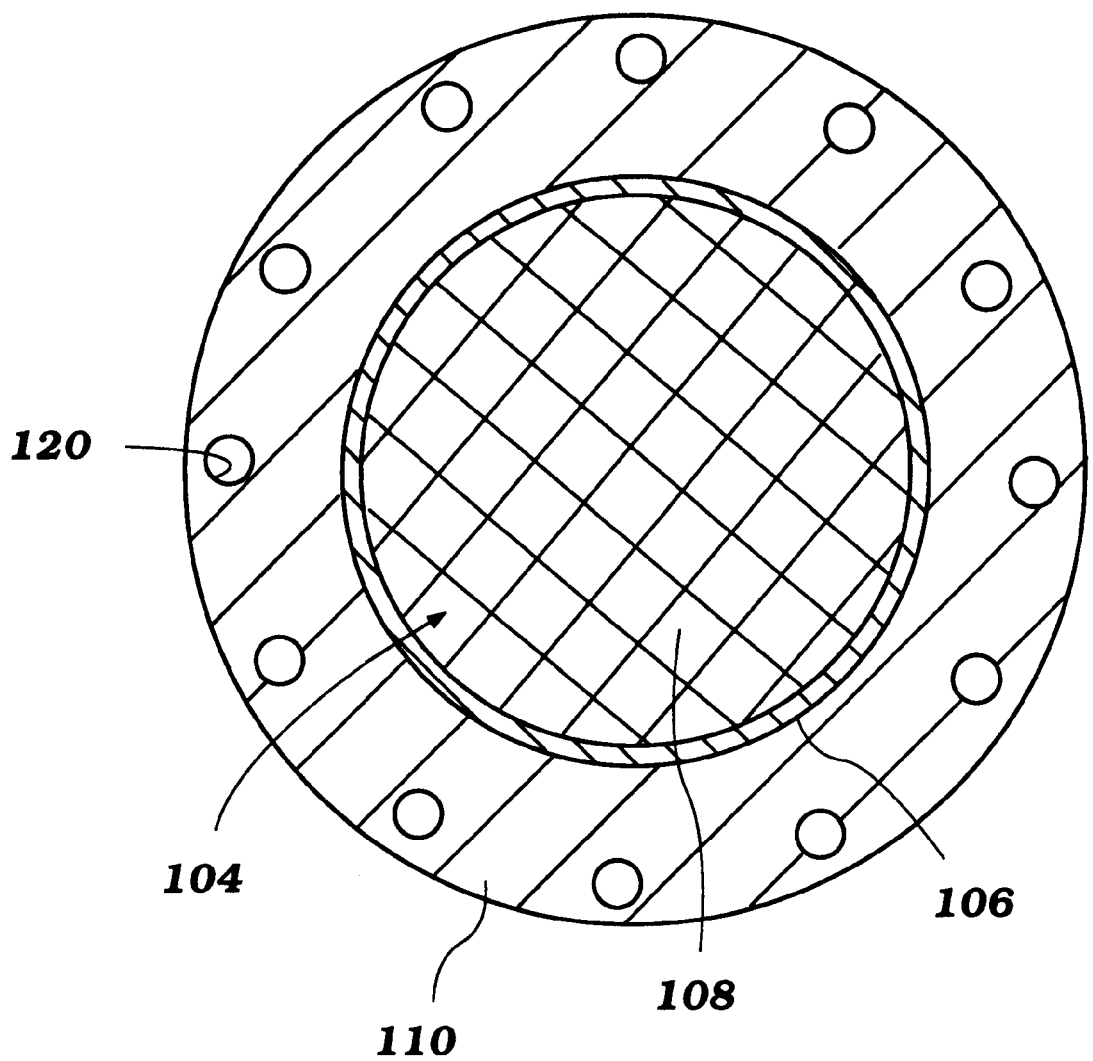
FIG. 5 is a further enlarged cross-sectional view taken along the line 5—5 of FIG. 4 and shows the catalyst bed and its mount.

As seen in FIGS. 4 and 5, the annular flange 110 also includes a plurality of apertures 120 which place the cooling jackets 96 of the upper and lower sections 112, 114 of the expansion chamber 90 in communication with each other.

The water jacket 96 of the upper section 112 receives cooling water from the water jacket 76 of the C-pipe 70. The lower section 114 of the expansion chamber 90 also includes a discharge port 122. The discharge port 122 is positioned just up stream of the discharge end of the expansion chamber 90. The port 122 also extends in a direction that is generally co-axial with the flow axis L through the expansion chamber 90. In this position, a portion of the cooling water flowing through the expansion chamber water jacket 96 flows through a discharge line 122 rather than through the exhaust pipe.

A discharge conduit 124 is connected to the port 122. As seen in FIG. 2, the conduit 124 extends rearwardly to a discharge end 126 of the exhaust system 12. In this manner, cooling water which is discharged through the conduit is introduced back into the body of water in which the watercraft 10 is operated.

With reference back to FIG. 4, the lower section 114 of the expansion chamber 90 includes a downwardly turned portion 128 that extends from an opening 129 and terminates at a discharge end 130. The downwardly turned portion also has a dual shell construction with an inner tubular portion stopping short of an outer tubular portion. In this manner, the water flow through the water jacket 96 merges with the exhaust gas flow through the expansion chamber volume $P_3$ at the discharge end 108 downstream of the catalyzer 104.

A conventional coupling 132 releasably connects a flexible pipe 134 to the discharge end 130 of the expansion chamber 90. As seen in FIGS. 1 and 2, the flexible pipe 134 extends rearwardly through a bulk head 136 of the rear compartment 34 and along one side of the watercraft hull tunnel 62. The flexible pipe 134 connects to an inlet section of a water trap device 138. The water trap device 138 also lies within the watercraft hull 16 on the same side of the tunnel 62.

The water trap device 138 has a sufficient volume to retain water and to preclude the back flow of water to the expansion chamber 90 and the engine 38. Internal baffles within the water trap device 138 help control water flow through the exhaust system 12.

An exhaust pipe 140 extends from an outlet section of the water trap device 138 and wraps over the top of the tunnel 62 to the discharge end 126 of the exhaust system 12. The discharge end 126 desirably opens into the tunnel 62 at an area that is close to or actually below the water level with the watercraft 10 floating at rest on the body of water.

As best seen in FIG. 1, 2 and 4, the above-described components of the exhaust system 12 desirably are arranged within the rear compartment 34 of the watercraft hull 14 to locate the catalyzer 104 near the access opening 35. In the illustrated embodiment, the access opening 35 lies above the engine 35 near the front end of the seat 22.

The access opening 35, as seen in FIG. 2, has a generally rectangular shape. The length of the access opening 35 in the direction parallel to the central longitudinal plane of the hull is longer than the length of the engine 38 in the same direction; however, the access opening 35 is not as wide as the engine and lies in a laterally centered position on the pedestal 29.

As best seen FIG. 4, the access opening 35 has a size sufficiently large size to provide access to the expansion chamber 90. To service or clean the catalyzer 104, a technician can remove the fasteners 118 and move the lower section 114 of the expansion chamber 90 away from the catalyzer. The flexible tube 134 bends during this procedure. The technician can then remove the catalyzer 104 from the expansion chamber 90.

Alternatively, the technician can remove the entire expansion chamber 90 from the rear compartment 34 before servicing or cleaning the catalyzer 104. For this purpose, the access opening 35 desirably has sufficient size through which to pass the expansion chamber 90, as well as a portion of the C-pipe 70. The adjustment mechanisms of the releasable coupling 100, 102 between the C-pipe 70 and the expansion chamber 90 also desirably lie near the access opening 35. In the illustrated embodiment, in fact, these portions of the couplings 100, 102 are positioned above the pedestal 29 to further improve their accessibility. The technician therefore can easily and conveniently service the catalyzer 104.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A personal watercraft comprising an internal combustion engine enclosed within a hull of a watercraft with an access opening into the hull, the engine having at least one exhaust port and an output shaft, a propulsion device driven by the engine output shaft, and an exhaust system extending between the engine exhaust port and a discharge port and including a catalyzer to treat exhaust gases from the engine before discharge through the discharge port, said catalyzer being positioned between and removably secured to first and second members of the exhaust system which are joined together by at least one fastener accessibly arranged on the exterior of the exhaust system said catalyzer and said fastener being located near the access opening such that the fastener and the catalyzer can be accessed or removed through the access opening.

2. A personal watercraft as in claim 1, wherein the catalyzer is located in an expansion chamber of the exhaust system.

3. A personal watercraft as in claim 2, wherein the catalyzer comprises a mount supporting a catalyst bed within the expansion chamber, and the mount is interposed between first and second sections of the expansion chamber, said first section of the expansion chamber being formed within said first member of the exhaust system and said second section of said expansion chamber being formed within said second member of the exhaust system.

4. A personal watercraft as in claim 3, wherein a releasable coupling connects the first section of the expansion chamber to an exhaust pipe.

5. A personal watercraft as in claim 3, wherein a releasable coupling connects a flexible hose of the exhaust system to an outlet end of the second section of the expansion chamber.

6. A personal watercraft as in claim 3 additionally comprising a cooling jacket encircling at least a portion of the expansion chamber and discharging at least a portion of coolant flowing through the cooling jacket into the exhaust system at a point downstream of the catalyzer.

7. A personal watercraft as in claim 6, wherein the mount of the catalyzer includes a plurality of apertures through which a first portion of the cooling jacket, which surrounds the first section of the expansion chamber, communicates with a second portion of the cooling jacket, which surrounds the second section of the expansion chamber.

8. A personal watercraft as in claim 1, wherein said access opening is formed above the engine.

9. A personal watercraft comprising an internal combustion engine housed within a compartment of a watercraft, the engine having at least one exhaust port communicating with an exhaust system which discharges exhaust gases from the engine to a discharge port, the exhaust system including a catalyzer, and a cooling jacket juxtaposed to at least a portion of the exhaust system and discharging at least a portion of coolant flowing through the cooling jacket into the exhaust system, said catalyzer being positioned and removably secured between first and second generally tubular members which are movable relative to each other, each member defining at least a first passage that forms a section of the exhaust system and a second passage juxtaposing at least a portion of said first passage to form a section of the cooling jacket, the hull including an access opening located near the catalyzer, such that the catalyzer can be accessed or removed through the access opening.

10. A personal watercraft as in claim 9, wherein said first member is arranged upstream of the catalyzer and communicates with the engine exhaust port and said second member is arranged downstream of the catalyzer and communicates with the discharge port.

11. A personal watercraft as in claim 10, wherein at least portions of said first and second members form at least part of an expansion chamber which houses said catalyzer.

12. A personal watercraft as in claim 11, wherein said catalyzer includes a catalyst bed supported within an exhaust stream through the exhaust system by a flange, said flange being held between first and second members of the exhaust system by at least one removable fastener.

13. A personal watercraft as in claim 12, wherein a first portion of the cooling jacket surrounds at least a portion of the first member, and a second portion of the cooling jacket surrounds at least a portion of the second member.

14. A personal watercraft as in claim 13, wherein said flange includes a plurality of apertures through which the first portion of the cooling jacket communicates with the second portion of the cooling jacket.

15. A personal watercraft as in claim 11, wherein said access opening has a sufficiently large size through which to pass the section of the exhaust system housing the catalyzer.

* * * * *